May 21, 1929.  R. F. KNIGHT  1,713,536
ASSORTING APPARATUS
Filed Nov. 11, 1920
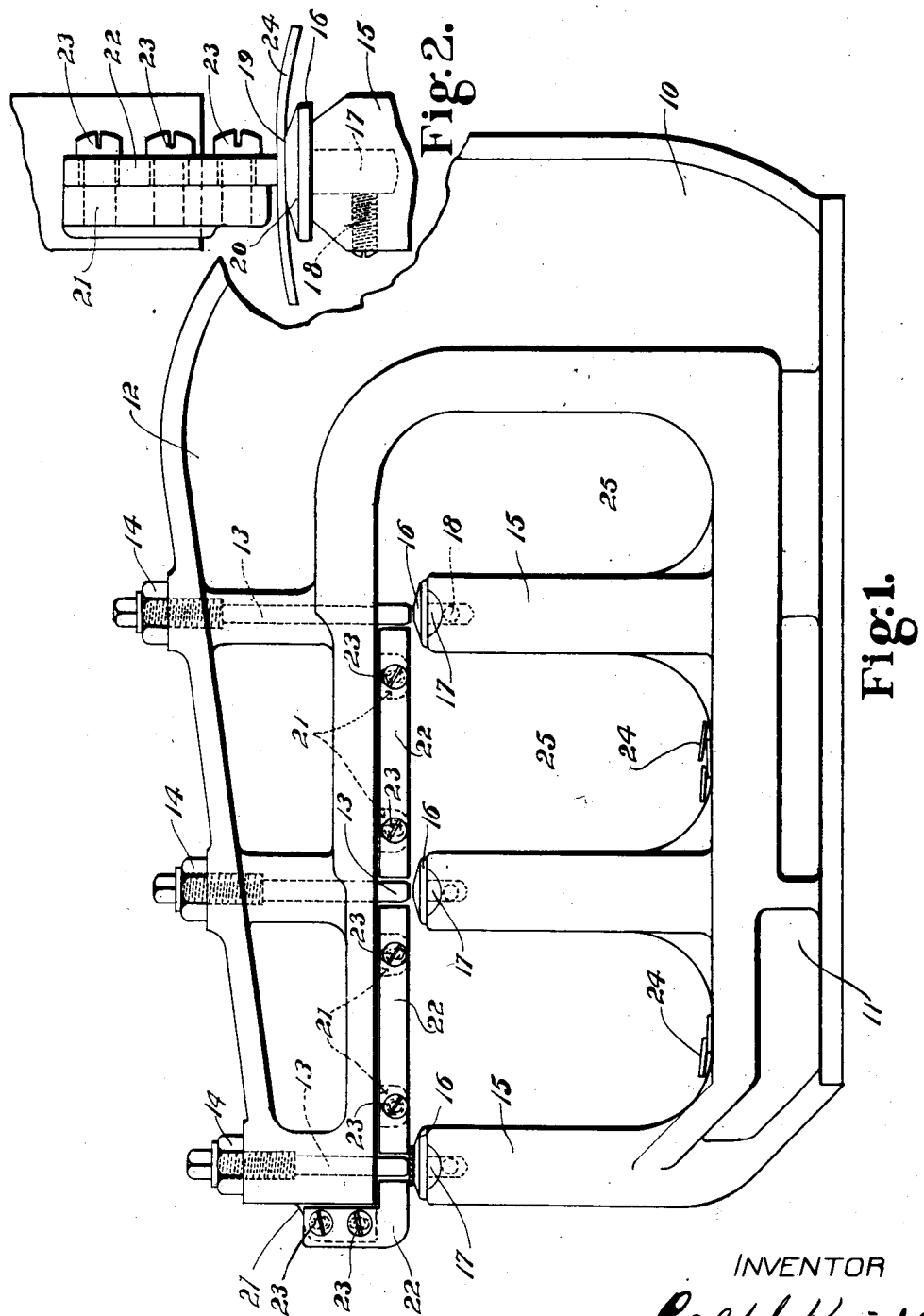
INVENTOR
Ralph Knight
By his Attorney
Nelson W Howard Patented May 21, 1929.

1,713,536

UNITED STATES PATENT OFFICE.

RALPH F. KNIGHT, OF BEVERLY, MASSACHUSETTS, ASSIGNOR TO UNITED SHOE MACHINERY CORPORATION, OF PATERSON, NEW JERSEY, A CORPORATION OF NEW JERSEY.

ASSORTING APPARATUS.

Application filed November 11, 1920. Serial No. 423,320.

This invention relates to devices for assorting articles according to a physical characteristic thereof, and is illustrated as embodied in a gaging device for separating into groups according to thickness articles in the form of strip material.

In the manufacture of metallic fastening devices, such, for example, as tacks used in the manufacture of shoes, it is usual to cut sheet metal into strips from which the tacks are afterwards formed. As the tacks and other fastenings are very frequently used in machines to which they are supplied by automatic feeding mechanism, a very slight variation in their size is of importance, in that it tends to render uncertain the operation of the feeding mechanism. To attain the desired uniformity of size in the finished tacks, it is desirable that the strips from which they are made be, so far as is possible, of uniform thickness. It is found, moreover, that when the dies of a tack-making machine have been set for strips of a certain thickness, if strips of a less thickness are fed to the machine, the resulting tacks will have heads and shanks which, instead of being round, are somewhat flattened on two sides. What is more serious from the shoemaker's point of view, if strips of too great thickness are fed to the machine, the dies cannot completely close over the tack blank, and a sharp fin is formed on two sides of the tack, which may stick in the automatic feeding mechanism later. It is thus evident that the strips should be as nearly uniform as possible in thickness, and an assorting or testing device of some kind, which must be both accurate and rapid in operation, is therefore desirable.

My invention has for an object the provision of an improved gaging or assorting apparatus, of which a preferred form is shown in this application, and which, as illustrated, comprises testing or gaging devices, in combination with guide members whereby the strips may be rapidly and easily guided through the testing devices.

A feature of my invention consists of a novel testing device or gage arranged both to perform the function of testing the metal strips for thickness and also to act positively to correct the position of strips which are improperly presented thereto.

A further feature of the invention comprises a novel arrangement of receptacles between the successive gaging devices of a series whereby, as the strips are passed by the operative through the successive gaging devices, they may be dropped when their size has been determined and strips of different thicknesses thus segregated. In the illustrated apparatus these receptacles are constituted by the supports for certain of the gaging members.

An illustrative embodiment of my improved assorting apparatus is shown in the attached drawing, in which Fig. 1 is a side elevation; and Fig. 2 is a front elevation of so much of the apparatus as shows one of the testing gages.

The illustrated apparatus comprises a support 10 which is extended forwardly in an arm 11 for the lower gage members and an arm 12 for the upper gage members, the whole being of a character suitable to be mounted on a bench or other stationary support.

Mounted in the arm 12 is a series of adjustable gage jaws 13 which are screw threaded into sockets in the arm 12. These gage jaws are clamped in adjusted position by lock nuts 14.

Upstanding from the lower arm 11 is a series of supports 15 each of which has a plane upper surface with a recess therein. Seated on the plane upper surface of each of the members 15 is a mushroom-shaped detachable gage member 16 having a stem 17 seated in the recess of member 15. Each of these mushroom-shaped gage members 16 is secured in position by a set screw 18, in opposed relation to the corresponding gage member 13.

As will be evident from a comparison of Figs. 1 and 2 the upper surface of each of the gage members 16 comprises an elliptoidal gaging surface 19 which extends for a short distance lengthwise of the apparatus and for a considerably greater distance transversely of the aparatus. Leading to this gaging surface is a convex conoidal or beveled guiding surface 20. The purpose of this formation is to secure a broad bearing surface which will wear but slowly, and at the same time to provide for straightening the position of strips which are improperly presented at an angle instead of parallel to the gaging surfaces of the gage members 13 and 16, as will hereinafter be explained.

Mounted on lugs 21 on the lower surface of arm 12 is a series of guides 22 leading from one gage to the next. These guides are secured by screws 23 which pass through slots in the guides whereby the guides may be adjusted vertically with reference to the lower gaging surface of jaws 13.

The metal strips 24 as they are assorted into groups according to their thickness are collected in receptacles 25 formed by the arm 11 and the upstanding supports 15.

In operation, an operative stands at the left in Fig. 1 or facing the apparatus in Fig. 2, seizes with his hands one of the strips to be sorted, moves it upwardly against the guide members 22 and pushes it forwardly into the apparatus. The different sets of jaws 13, 16 are so adjusted that the spaces between them progressively diminish. Thus if the strip presented by the operative is thicker than the maximum for which the apparatus is set it will be stopped by the first gage and will be prevented from entering at all. If it is slightly thinner than the maximum it will pass the first gage and be stopped by the second one, whereupon it is released by the operative and falls into the first receptacle 25. In the same way the remaining strips are separated into groups which are successively thinner.

While theoretically the lower surface of guides 22 should be in the same plane as the lower gage surfaces of upper jaws 13, in practice it is found desirable to adjust them a hair's breadth higher. This in no way interferes with their action in guiding the strips into the successive gages, while it insures that the gage members 13 and not the guide members 22 actually co-operate with gage members 16 to test the thickness of the strips.

By reason of the peculiar formation of the mushroom-shaped gage member 16, if a strip is improperly presented to the apparatus by the operative it will be guided positively into a straightened position before it enters between the gage jaws, as illustrated in Fig. 2. The improperly presented strip will contact on its higher side with one edge of guide member 22 and on its lower side with the conoidal or beveled surface 20 of the gage and this conoidal surface will act as a cam, against which the strip bears and is thus forced into a straightened position.

While my invention has been shown as embodied in a preferred form which has been described in detail, it is not intended to limit its scope thereby. In certain of its features it is capable of more general use, and such broad scope of the invention is intended to be embraced within the terms of the appended claims.

Having described my invention, what I claim as new and desire to secure by Letters Patent of the United States is:

1. An apparatus for assorting articles according to a physical characteristic thereof, comprising a series of gages constructed and arranged to facilitate the sorting of articles and each comprising a pair of gage members located one above the other, guides between said gages, and a receptacle for each gage arranged adjacent to the gage members so that an article which is too large to pass between the gage members of a pair may be dropped directly into the corresponding receptacle.

2. A device for assorting articles according to thickness, comprising a series of gages each consisting of a pair of opposed gage members arranged to prevent the passage of an article of a thickness greater than the distance between said gage members, guide members between said gages to conduct articles thereto, and a plurality of receptacles to receive the assorted articles.

3. A device for assorting articles according to thickness, comprising a series of gages having successively narrower jaws, the upper jaws being substantially in the same plane, members between said gages each with a guide surface approximately in said plane, and a plurality of receptacles, each arranged between two succeeding gages to receive the assorted articles.

4. In a device for assorting articles according to thickness, a series of gages each comprising spaced jaws, the jaws of each gage after the first being spaced apart a lesser distance than the jaws of the immediately preceding gage, and separate means for guiding the articles from one gage to the next.

5. In a device for assorting articles according to thickness, a series of gages each comprising spaced jaws, the jaws of each gage after the first being spaced apart a lesser distance than the jaws of the immediately preceding gage, the upper jaws of all said gages being arranged in a single plane, and guide members having surfaces, approximately in said plane, between the gages.

6. In a device for assorting articles according to thickness, a series of gages each comprising spaced jaws, the jaws of each gage after the first being spaced apart a lesser distance than the jaws of the immediately preceding gage, the upper jaws of all said gages being arranged in a single plane, and guide members having surfaces approximately in said plane between the gages, the lower jaw of each of said gages being provided with a beveled surface for co-operating with one of said guide surfaces to straighten the position of articles improperly presented to the gage.

7. A bench gage comprising a stationary frame, a series of upper and lower co-operating gage members carried thereby, the gage members of each succeeding series being progressively closer together, a series of guides positioned between the upper gage members to facilitate the presentation of articles to the gage members, and a series of receptacles between the lower gage members arranged to receive the gaged articles.

8. A gage for strips of material comprising an upper gage jaw, a guide having a surface approximately in the plane of the gaging surface of said upper gage jaw, and a lower gage jaw with a curved surface at an angle to the gage surface of said lower jaw, and adapted to co-operate with said surface of the guide to straighten the position of such strips as may be improperly presented and to guide them to the gage jaws in a correct position.

9. A bench gage comprising co-operating upper and lower gage members, the latter each being of a mushroom form with a flat top so as to facilitate the presentation of the work thereto, and a series of receptacles arranged between adjacent lower gage members to receive articles which pass the preceding lower gage member but fail to pass the succeeding lower gage member.

10. A bench gage having an upper and a lower gage member, the lower gage member being of a mushroom formation with a flat top so as to facilitate the presentation of articles thereto, and a pair of receptacles arranged respectively in front of and behind said gage members to receive respectively articles which do not and which do pass between the gage members.

11. In a device for use in assorting blanks according to thickness, a fixed support, a readily removable gage member mounted therein, a guide member arranged to conduct articles to said gage member, a second fixed support spaced from said first support, and a second gage member co-operating with the first and adjustably mounted in said second support.

12. A thickness-gage, one jaw of which comprises a fixed support having a plane surface and a recess, and a mushroom-shaped gage member seated on said surface with its stem in said recess, the work-gaging surface of said gage member being a transversely elongated elliptoid.

13. A thickness-gage, one jaw of which comprises a fixed support having a plane surface and a recess, a mushroom-shaped gage member seated on said surface with its stem in said recess, and means for securing said gage member to the support.

14. In an assorting apparatus, a member having a guide on its lower surface, in contact with which an article may be moved, and means for correcting the position of articles presented to the apparatus out of parallel to said guide.

15. In an assorting apparatus, a member having a guide on its lower surface in contact with which an article may be moved, and a gage spaced therefrom, said gage including means to correct the position of articles into parallel with the guide surface.

16. In a testing apparatus, a fixed testing device, in combination with a member adjacent thereto having a guide portion on its lower surface, against which articles may be held by an operator and moved to be presented to said device and from which the articles will drop when released by the operator.

17. In a testing apparatus, a testing device, in combination with a member adjacent thereto having a guide portion on its lower surface, against which articles may be held by an operator and moved to be presented to said device, and a receptacle below said member into which tested articles will drop when released by the operator.

18. A bench gage comprising a device for separating articles into groups according to a physical characteristic thereof, in combination with a stationary member having a guide on its lower surface against which articles held in the hands of an operator may be moved to be presented to said device.

19. A bench gage comprising a device to assort articles, a stationary support, and a member adjustably mounted on said support and in fixed relation thereto for guiding articles to the assorting device.

20. In an assorting apparatus, a device for separating articles into groups according to a physical characteristic thereof, in combination with a member having a guide on its lower surface against which articles may be held by an operator and moved to be presented to said device, and a plurality of receptacles for the various groups into which assorted articles may fall when released by the operator.

21. A device for assorting articles having a series of upper gage members, a series of lower gage members cooperating therewith, and a guide member arranged between each adjacent pair of upper gage members, the lower gage member being formed to constitute a series of receptacles arranged to receive articles as released by the operator.

22. A gage jaw terminating in an elongated elliptoidal, plane surface surrounded by a conoidal surface.

23. A gage jaw having a stem carrying an enlarged article engaging member terminating in an elongated elliptoidal, plane surface surrounded by a conoidal surface.

In testimony whereof I have signed my name to this specification.

RALPH F. KNIGHT.